US007534168B2

(12) United States Patent
Bennett et al.

(10) Patent No.: US 7,534,168 B2
(45) Date of Patent: May 19, 2009

(54) SLOT MACHINE HYBRID PIN AND BALL GAME

(75) Inventors: Nicholas Luke Bennett, Mosman (AU); David Villa, Cronulla (AU); Christopher Michael Stevens, Lane Cove (AU)

(73) Assignee: Aristocrat Technologies Australia Pty, Limited, North Ryde NSW (AU)

(*) Notice: Subject to any disclaimer, the term of this patent is extended or adjusted under 35 U.S.C. 154(b) by 418 days.

(21) Appl. No.: 09/902,901

(22) Filed: Jul. 10, 2001

(65) Prior Publication Data

US 2002/0094856 A1 Jul. 18, 2002

Related U.S. Application Data

(63) Continuation-in-part of application No. 09/856,869, filed as application No. PCT/AU99/01047 on Nov. 24, 1999.

(30) Foreign Application Priority Data

Nov. 24, 1998 (AU) ...................................... PP7293

(51) Int. Cl.
*A63F 9/24* (2006.01)
*A63F 13/00* (2006.01)

(52) U.S. Cl. ............................ 463/20; 463/16; 463/17; 463/18; 463/19; 463/25; 463/29; 463/43; 463/49; 273/138.1; 273/138.2; 273/143 R

(58) Field of Classification Search ............. 463/16–20, 463/31, 25–29, 46; 273/143 R, 121 B, 121 R, 273/120 A, 123 R, 124 A, 123 A, 108.1, 138.1–138.2; 283/903
See application file for complete search history.

(56) References Cited

U.S. PATENT DOCUMENTS

| | | | | | |
|---|---|---|---|---|---|
| 2,614,840 | A | * | 10/1952 | Monkres ................. | 273/121 A |
| 2,783,754 | A | * | 3/1957 | Heiss .......................... | 124/82 |
| 4,508,343 | A | * | 4/1985 | Peters et al. ............ | 273/119 A |

(Continued)

FOREIGN PATENT DOCUMENTS

| | | |
|---|---|---|
| AU | 23619 | 4/1999 |

(Continued)

OTHER PUBLICATIONS

Translation of Official Office action corresponding to Japanese Patent Application No. 2000-583605, mailed Mar. 7, 2008, 4 pages.

*Primary Examiner*—Robert E. Pezzuto
*Assistant Examiner*—Ryan Hsu
(74) *Attorney, Agent, or Firm*—McAndrews, Held & Malloy Ltd.

(57) ABSTRACT

An electronic gaming console is illustrated having a console cabinet 10 including a prize display 12, a coin entry slot 13, a payout tray 14 and internally mounted game control processor circuits. A video game is provided for play on the console in which images of spinning reels spin and objects (balls) are dropped through a series of obstacles (pins) and eventually land in one or more of a set of containers. Prizes are paid according to either the state of the reels after spinning or the number of balls which are in each container at the end of the ball drop and/or the manner in which the pins are hit.

3 Claims, 15 Drawing Sheets

U.S. PATENT DOCUMENTS

| | | | | | |
|---|---|---|---|---|---|
| 5,085,436 | A | * | 2/1992 | Bennett | 463/21 |
| 5,149,094 | A | * | 9/1992 | Tastad | 273/121 A |
| 5,509,655 | A | * | 4/1996 | Ugawa | 273/121 B |
| 5,788,230 | A | * | 8/1998 | Krise et al. | 273/120 A |
| 5,836,819 | A | * | 11/1998 | Ugawa | 273/121 B |
| 5,882,261 | A | * | 3/1999 | Adams | 273/121 B |
| 6,029,973 | A | * | 2/2000 | Takemoto | 273/121 B |
| 6,047,963 | A | | 4/2000 | Pierce et al. | |
| 6,139,013 | A | * | 10/2000 | Pierce et al. | 273/121 B |
| 6,159,095 | A | * | 12/2000 | Frohm et al. | 463/19 |
| 6,203,009 | B1 | * | 3/2001 | Sines et al. | 273/121 B |
| 6,203,428 | B1 | * | 3/2001 | Giobbi et al. | 463/16 |
| 6,213,875 | B1 | * | 4/2001 | Suzuki | 463/20 |
| 6,220,593 | B1 | * | 4/2001 | Pierce et al. | 273/138.1 |
| 6,220,596 | B1 | | 4/2001 | Horan | |
| 6,296,568 | B1 | * | 10/2001 | Tracy | 463/17 |
| 6,340,158 | B2 | * | 1/2002 | Pierce et al. | 273/138.1 |
| 6,398,645 | B1 | * | 6/2002 | Yoseloff | 463/19 |

FOREIGN PATENT DOCUMENTS

| | | | | |
|---|---|---|---|---|
| DE | 3638100 | A1 | * | 5/1988 |
| GB | 2243236 | A | * | 10/1991 |
| JP | 5290339 | | | 11/1993 |
| JP | 06015027 | | | 1/1994 |
| JP | 6053173 | | | 2/1994 |
| JP | 6336787 | | | 12/1994 |
| JP | 7114829 | | | 5/1995 |
| JP | 8182819 | | | 7/1996 |
| JP | 8280874 | | | 10/1996 |
| JP | 09-103541 | | * | 4/1997 |
| JP | 10165652 | | | 6/1998 |
| WO | WO 0030727 | | | 11/1999 |
| WO | WO 00/30727 | | * | 6/2000 |

* cited by examiner

SLOT MACHINE HYBRID PIN AND BALL GAME

RELATED APPLICATION

This application is a continuation-in-part of U.S. application Ser. No. 09/856,869, which is the National Stage (filed on May 28, 2001) of International Application PCT/AU99/01047 having an international filing date of Nov. 24, 1999, which claims priority to Australian Patent Application No. PP7293 filed Nov. 24, 1998.

INTRODUCTION

The present invention relates to gaming machines or consoles of the type generally referred to as slot machines, and in particular the invention provides a new type of game played on such a machine.

Players who regularly play gaming machines quickly tire of particular games and therefore it is necessary for manufacturers of these machines to come up with innovative games or game features that add interest to the games provided on such machines in order to keep the players amused and therefore willing to continue playing the game.

DESCRIPTION OF THE PRIOR ART

Gaming or poker machines have been well known in a number of countries for many years and have more recently gained increased popularity in those jurisdictions in which they were already known as well as becoming more widely accepted in new jurisdictions. As a result quite substantial amounts of money wagered on these machines world wide. There is a growing tendency for governments of various States to legalise the use of gaming machines by licensing operators, with resulting revenue gains through licence fees and taxation of monies invested. The licensed operation of gaming machines is generally the subject of legislation and regulation within any respective State. This regulation almost always dictates a minimum percentage payout for a gaming machine. For example, a minimum of 85% of monies invested must be returned as winnings, and manufacturers of gaming machines therefore must design their machines around these regulatory controls.

With the growth that has occurred in the gaming machine market there is intense competition between manufacturers to supply the various existing and new venues. When selecting a supplier of gaming machines, the operator of a venue will often pay close attention to the popularity of various games with their patrons.

Therefore, gaming machine manufacturers are keen to devise games which are popular with players, as a mechanism for improving sales.

In particular, manufacturers regularly devise new games which have not previously been seen on slot machines in order to stimulate renewal of player interest.

Pachinko is a game popular in Japan in which an 11 mm diameter steel ball is fired into a labyrinth of pins or nails projecting from a back panel and awards are gained if the balls can be caused to come to rest in certain locations. Typically, when a ball is caused to come to rest in a designated prize winning position, the player is rewarded with additional balls, the number of balls awarded to the player being dependant on the particular location that the ball is brought to rest. The player purchases balls from the operator before commencing play, or when he runs out and after stopping play, a player may exchange balls for non-monetary prizes.

In this specification the term Gaming console will be used to refer to a gaming machine of the type having a video display screen on which a game is displayed with player inputs being either by physical buttons joysticks etc or by pseudo buttons, etc, provided as touch sensitive areas on the display, or a mixture of each. Typical games that have previously been provided on such consoles include video simulations of spinning reels or video card games among others.

SUMMARY OF THE INVENTION

According to a first aspect the present invention consists in an electronic gaming console having credit means, reward means, game control means, display means, and player input controls, the control means being responsive to the credit means and the player input controls to play a game which is displayed on the display means and if a winning event occurs, a player reward is awarded by the reward means, the gaming console being characterised in that the game provides a video display, for displaying a game image of a hybrid game comprising one or more rotatable reels of a spinning reel game and a labyrinth of virtual pins or pins and holes of pin and ball game and the player input controls allow the player to initiate the motion of the one or more rotatable reel images and one or more ball images on the display, player rewards being awarded when the reel and ball images come to rest in predetermined prize winning positions, the spinning reel and pin and ball games each potentially contributing to a single game outcome.

According to a second aspect the present invention consists in an electronic gaming console having credit means, reward means, game control means, display means, and player input controls, the control means being responsive to the credit means and the player input controls to play a game which is displayed on the display means and if a winning event occurs, a player reward is awarded by the reward means, the gaming console being characterised in that the game provides a video display, for displaying a game image of a game comprising one or more targets in a game field and the player input controls allow the player to initiate the motion of one or more ball images on the display, player rewards being awarded when the ball images come to rest in or pass through predetermined prize winning target positions.

The targets are preferably containers or cups and each target may be formed as a pair of virtual pins appearing to extend out of the plane of the field and having a container suspended between them. Preferably holes will be positioned behind each of the targets to allow a ball to pass through a target, such that the target remains empty to receive further balls in a multi-ball game, and such that the prize associated with each target may be won multiple times in one game. Additional pins and holes may optionally be scattered around the field in addition to those associated with targets. Additional targets may be provided which move during the game such as a railway skip car running around a track and periodically appearing out of a tunnel. Prize values associated with targets may change from game to game or during a game.

While the pin and ball game may be played with any number of balls, on one particularly preferred embodiment the pin and ball game is played with a single ball.

Preferably the prize winning outcomes are determined by an outcome of the spinning reel game and may be modified by a ball arriving at a bonus position of the pin and ball game. In one preferred embodiment, the reels stop spinning before the ball or balls reach the bonus position. In a particularly preferred embodiment the balls or balls are projected from a location remote from the labyrinth and the reels stop spinning before the ball or balls enter the labyrinth.

In the preferred embodiment, the spinning reel game comprises a plurality of reels each carrying a plurality of symbols located sequentially around its circumference, such that when the reels spin and stops a result is defined by a outcome line of symbols formed by one symbol from each reel which is in a predetermined stopping position of the respective reel, prize winning combinations of symbols being predefined and a prize being awarded if one of the prize winning combinations occurs on the outcome line.

In one embodiment of the present invention, at least one substitution location is defined in the pin and ball game such that if a ball comes to rest at the substitution location a symbol is substituted for a symbol in the outcome line of the spinning reel game to assist in forming a prize winning combination. In one variation of this embodiment the symbol substituted on the outcome line will cause a prize to be awarded if two symbols of a kind are displayed on the outcome line of the spinning reel game and the substituted symbol is of the same kind. This variation can be implemented such that the substituted symbol is determined to be the same as any two symbols of a kind that occur on the outcome line of the spinning reel game, or alternatively such that the substituted symbol is a predetermined symbol and the substituted symbol will only modify the outcome of the spinning reel game if the two symbols of a kind match the predetermined symbol.

Gaming consoles according to the invention may award prizes as redeemable credits, or as free games or in various other forms depending upon the jurisdictional requirements and the particular game design. Prize value may also vary as a function of the wager or the number of credits bet.

In one particularly preferred embodiment of the invention, the pin and ball game modifies the outcome of the spinning reel game by modifying the prize associated with the outcome combination as a result of the location at which a ball arrives in the pin and ball game. In one version the prize is modified by multiplying it by a predetermined multiplier if the ball lands in a predetermined prize zone. However the pin and ball game may have a number of prize zones each offering at least one bonus feature or prize. Also the number and position of the prize zones may be variable from game to game. Further, number and position of the prize zones may be player selectable. This may be achieved as a result of the size of the bet wagered by the player on the particular game.

The prize zones preferably comprise targets such that if a ball comes to rest in or on the target, a reward is awarded. These targets may be surfaces of objects, such as containers or cups. The number of active or prize awarding containers may be player selectable such as via the size of the wager or the number of credits bet.

In the preferred embodiment, one or more containers are associated with a bonus feature whereby the feature is awarded if a ball lands in a container. The feature may also require the container or containers to be filled in a pre-determined way for the feature to be awarded. For example, it may be necessary for a predetermined number of balls to be caught in a predetermined set of one or more containers for the bonus feature to be awarded. The feature may simply be the awarding of a further prize in addition to the prize associated with the outcome combination. Alternatively the feature may modify the outcome of the spinning reel game by awarding a bonus game, an animated feature game displayed as a new screen image, or may initiate a feature present on the screen of the main game such as a chocolate wheel which is spun to select a feature prize, and if the feature achieves a prize winning result, awarding a bonus prize determined by the result of the bonus game in addition to the prize associated with the outcome combination.

In some embodiments, the player controls may also be used to control firing parameters such as firing speed and firing direction. Player controls may also be used to operate features which affect the trajectory of a ball after it is fired.

In one embodiment, the game is characterised in that the number of balls provided to a player for a game is dependant upon a number of credits bet on the game. In some embodiments, the number of balls provided for the first credit may be different to the number of balls provided for subsequent credits wagered on a game.

In another embodiment, the game is characterised in that the configuration of the labyrinth of pins is varied depending upon the number of credits bet.

In yet a further embodiment, the game is characterised in that rewards are assigned to one or more of the pins, such that the reward is awarded if the pin is struck by a ball and the number of pins having rewards assigned to them is related to the number of credits bet.

Other features of preferred embodiments may include:

(i) awarding prizes/bonuses/features depending on how the containers and/or pins are hit, (ii) incorporating other types of games into the base game. For example, spinning reels (see below), keno, bingo, card games, second screen animations, chocolate wheels (see below) and so on. These can be bonus features awarded from the base game, base games that trigger a feature of the pin and ball game or may be played in conjunction with the base game (eg, reels spin and then balls drop for every game played).

(iii) an independent chocolate wheel is displayed where certain triggers or prizes can cause the chocolate wheel to spin to reveal a bonus by way of a prize, win multiplier, number of free games, extra balls to drop, change in the game structure or similar, (iv) an independent chocolate wheel is displayed so that whenever balls fall into certain containers or similar, the chocolate wheel will spin to reveal the prize that will be awarded.

Chocolate wheels are divided into a plurality of wheel segments with one symbol or prize indicia indicated or displayed in each segment. To indicate the selection of one symbol or prize indicia, a rotation is indicated which slows to a final stopping position, there being at least one possible stopping position per wheel segment and the stopping position indicates the prize indicia or symbol to be selected. In a particularly preferred embodiment new prize indicia or symbols are selected and displayed on the respective wheel segments at the commencement of each main game.

Where a chocolate wheel is employed the chocolate wheel may be of the conventional kind where the whole wheel image rotates in which case the symbols or prize indicia indicated on segments of the wheel are not discernible while the wheel is spinning rapidly. However in a particularly advantageous embodiment the central portion of the wheel which caries the symbols or prize indicia remains stationary and only indicators, around the periphery of the wheel indicate rotation and a final stopping position. This may be achieved for example by providing a series of virtual lights around the wheel image such that rotation is indicated by lighting the lights in sequence in a so called chasing pattern such that the illuminated lights change in a rotating pattern. The rotation will slow to a stop with a light left illuminated adjacent to one wheel segment to indicate the prize indicia or symbol carried on that segment as the selected symbol or prize.

Containers may have the following features or characteristics:

(i) a free game, free balls or any other type of bonus can be won when certain containers are filled in a pre-determined way, for example: 10 free games are won when 2 or more balls end up in the last column, (ii) a slot reel, chocolate wheel or other mechanism may be activated by a ball or other means to provide a multiplier, bonus or trigger, (iii) a chocolate wheel could replace a prize container where as the ball drops through the chocolate wheel, it will spin and pay the prize that is spun up.

BRIEF DESCRIPTION OF THE DRAWINGS

Embodiments of the present invention will now be described by way of example with reference to the accompanying drawings in which.

DETAILED DESCRIPTION OF THE PREFERRED EMBODIMENTS

In the following detailed description, the methodology of the embodiments will be described and it is to be understood that it is within the capabilities of the non-inventive worker in the art to introduce the methodology on any standard microprocessor based gaming console by means of appropriate programming.

The present invention relates to a game that is a hybrid between a spinning reel game and a pin and ball game. Various spinning reel games have existed for some time and those features of spinning reel games that are known will not be described in detail. However video pin and ball games are relatively unknown and the various features and variations that might be employed in embodiments of the present invention will now be described in some detail.

Figure 1:
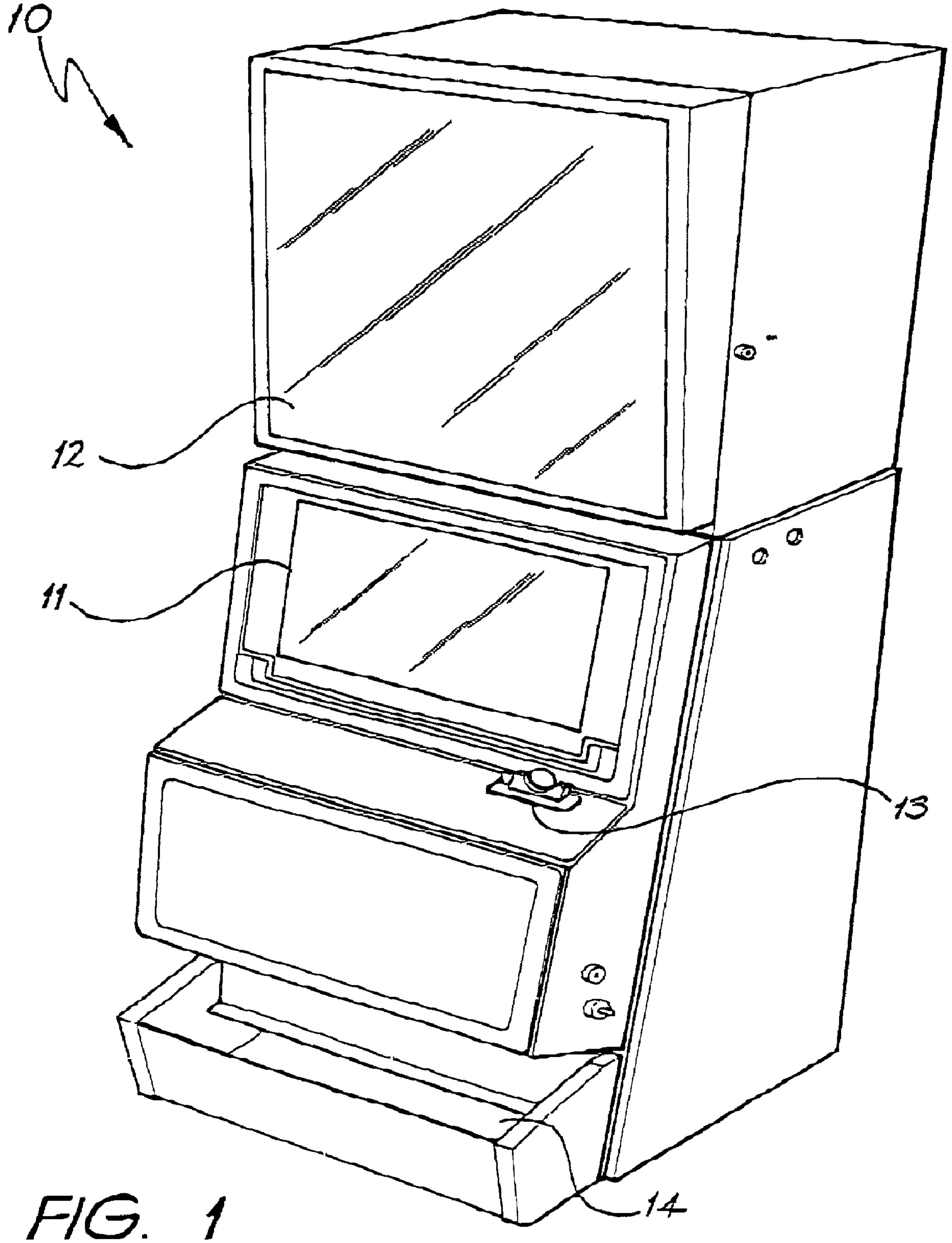
FIG. 1 illustrates a touch screen gaming console incorporating the present invention.
Figure 2:
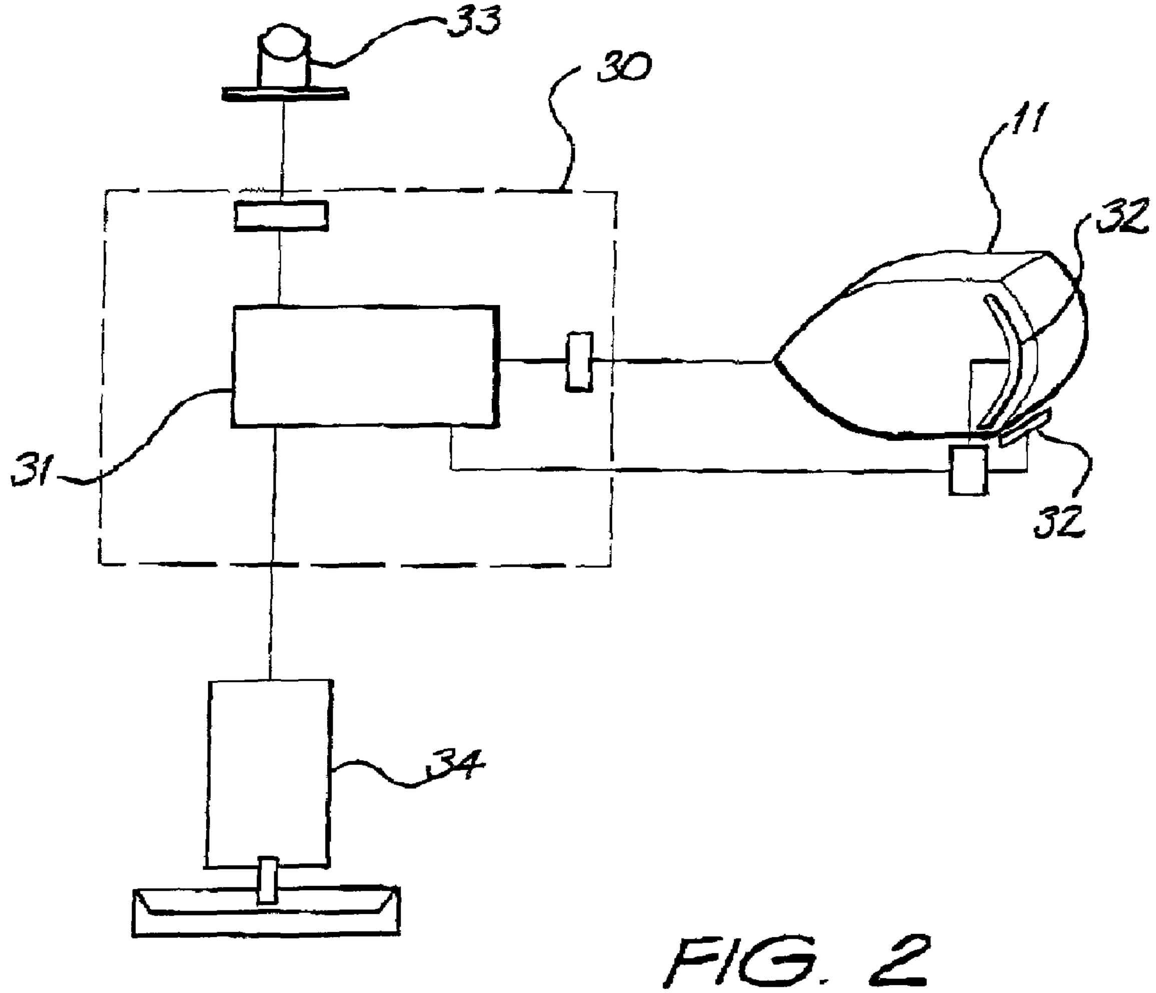
FIG. 2 is a schematic diagram of a gaming console control circuit.

Referring to FIG. 1, the illustrated embodiment of the invention is housed in a conventional gaming console cabinet 10 including a prize display 12, a coin entry slot 13, a payout tray 14 and internally mounted game control processor circuits (refer to FIG. 2).

The program to implement the game of the present invention runs on a standard gaming console control processor 31 as illustrated schematically in FIG. 2. This processor forms part of a controller 30 which drives the display screen 11 and receives input signals from input controls such as buttons or touch sensitive areas on a video display. In the illustrated embodiment, the controller receives touch input signals from touch sensors 32 as well as receiving coin input pulses from a coin chute mechanism 33 and sends signals to drive a coin payout mechanism 34.

This is a new type of video game which involves balls (objects) being dropped through a series of pins (obstacles) and eventually filling a number of containers.

It is similar in some respects to games known as Pachinko, which are pin and ball games popular in Japan, however, this video embodiment includes features not evident in prior art slot machines. Examples of the display layout of games according to the present invention are illustrated in FIGS. 3 & 4.

Figure 3:
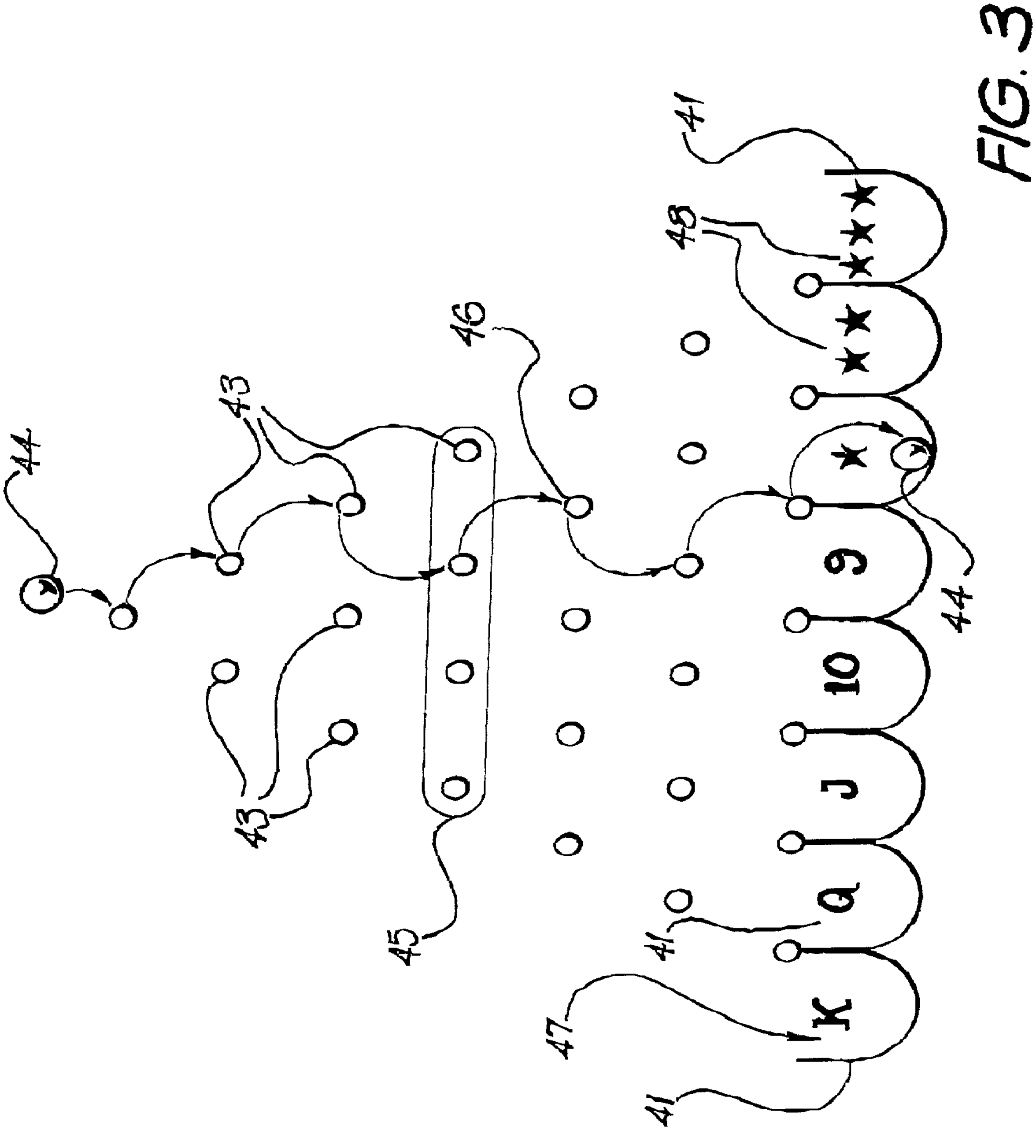
FIG. 3 is a diagram of a game screen with game features indicated.
Figure 4:
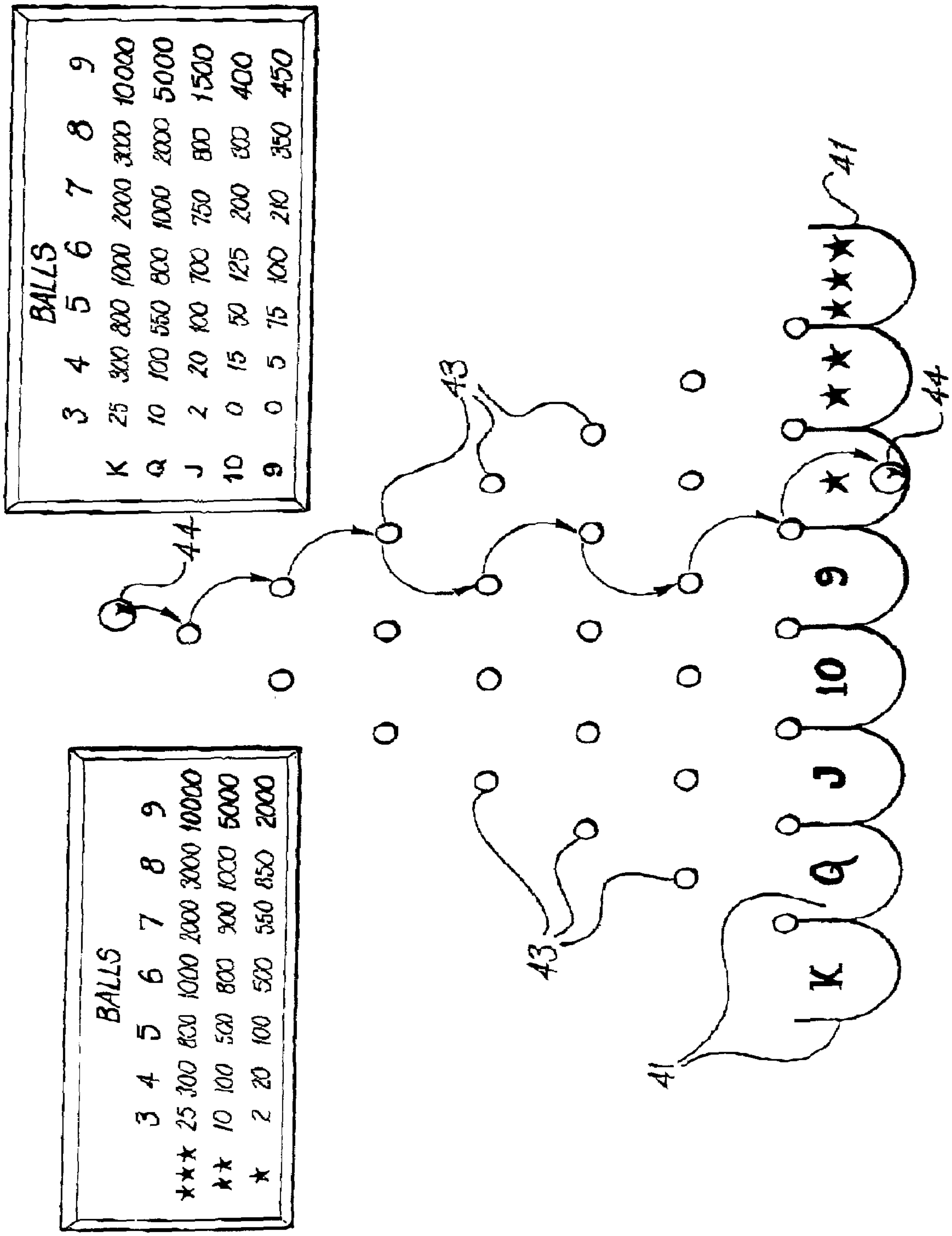
FIG. 4 is a diagram of a game screen showing prizes awarded for various numbers of balls in each of a plurality of buckets.

In FIG. 3, a game display is illustrated showing a plurality of possible game features in combination. The game includes as feature prizes:

a) free games b) win multipliers c) extra balls

As the balls 44 fall through the pins 42 and are collected in buckets 41, if each of the pins in the row 45 is hit (ie, by a different ball in this game, but in other games possibly by the same ball where rebounding and/or flippers are provided), a feature prize is awarded. A second feature is provided if all balls hit a particular pin 46. A third feature is provided if all balls fall into a single bucket 47. A fourth feature 48 is awarded if at least one ball falls into each bucket 41.

Referring to FIG. 4, a similar game to that of FIG. 3 is illustrated with pay tables shown for different number of balls in each bucket.

Figure 5:
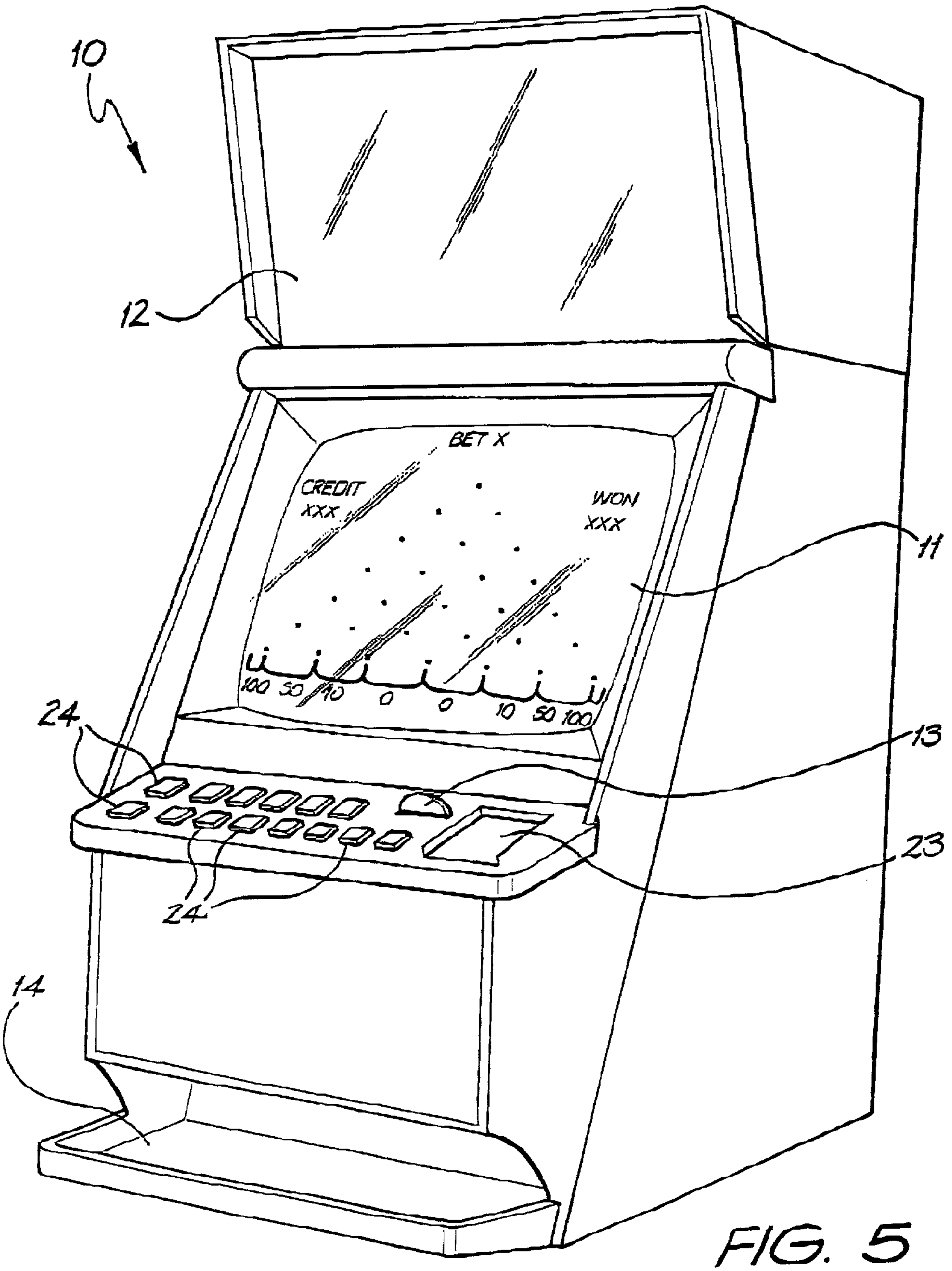
FIG. 5 illustrates a gaming console with button switch controls, incorporating a simple embodiment of the present invention.

Referring to FIG. 5, an example of a further simple embodiment of the invention is illustrated showing the entire console 10 with a simple game layout on the screen 11.

Again, the console includes a display panel 12, which has rules of the game and/or prize winning events illustrated for player information, a coin slot 13, video display screen 11 to display the game and a coin tray 14. As well, this embodiment has a bill acceptor 23 and push buttons 24 to control the game.

Figure 6:
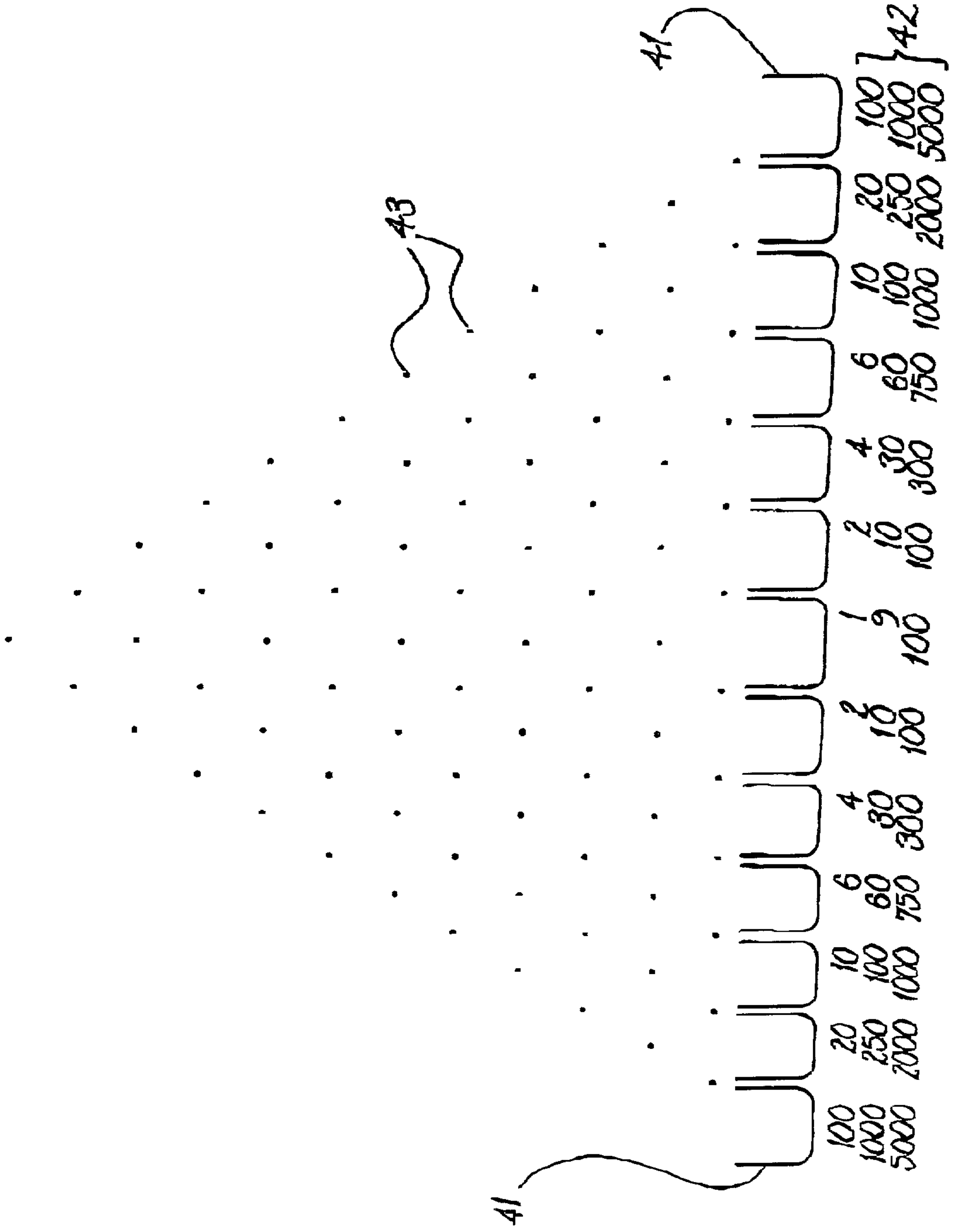
FIG. 6 illustrates a basic game screen layout without features.

FIG. 6 illustrates a basic game screen layout without additional game features. It should be noted that the different prize rows 42 under the buckets could be awarded for different numbers of balls, different types of balls (eg. shape, colour) or different ball combinations landing in the buckets; or even different ball drop patterns or similar.

Figure 7:
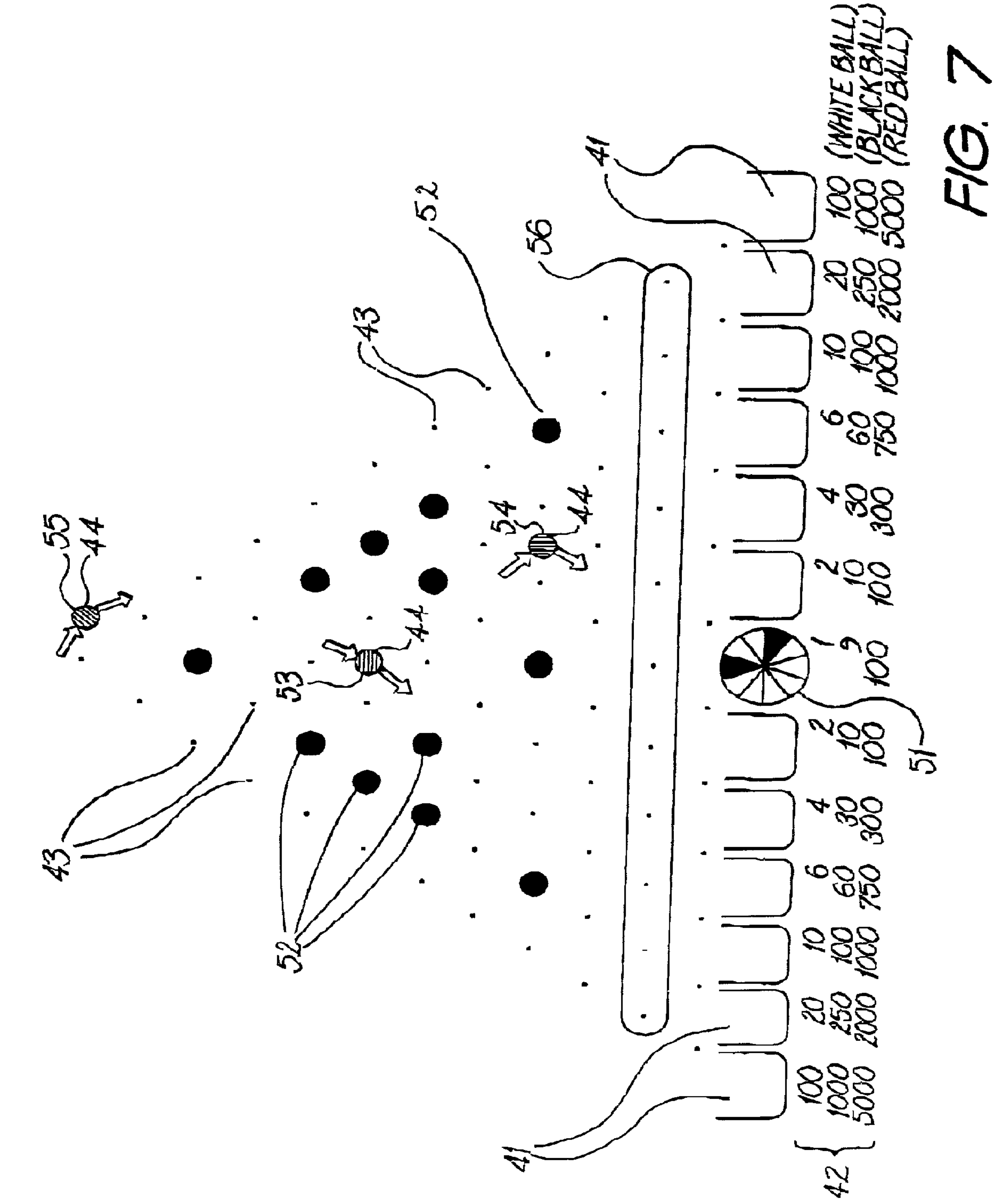
FIG. 7 illustrates a game screen layout with a set of preferred features.

FIG. 7 illustrates a game screen layout with a set of preferred features. In this embodiment the number of balls 44 dropped is dependent upon the number of credits staked (for example 1 credit buys 10 balls). A series of holes 52 are located amongst the pins such that if a ball passes over that point it will disappear from the screen. Balls that manage to avoid all of the holes 52 will either drop into a bucket 41 or through the chocolate wheel 51 at the bottom of the display. The balls 44 are in 3 different colours (randomly selected) 53, 45, 55 and prizes are paid at the end of the ball drop according to the colour of any balls that made it to a bucket 41. In the case of the chocolate wheel 51, prizes are awarded for each ball that drops through the chocolate wheel, causing the chocolate wheel to spin. The prize paid for the chocolate wheel is dependent upon the position in which the wheel stops. A feature is also included where one of the rows 56 below the holes contains pins that become lit when they are hit. If 3 or more pins become lit in one game then 10 free games are awarded during which all of the holes are replaced by pins (hence guaranteeing a prize for each ball).

Figure 8:
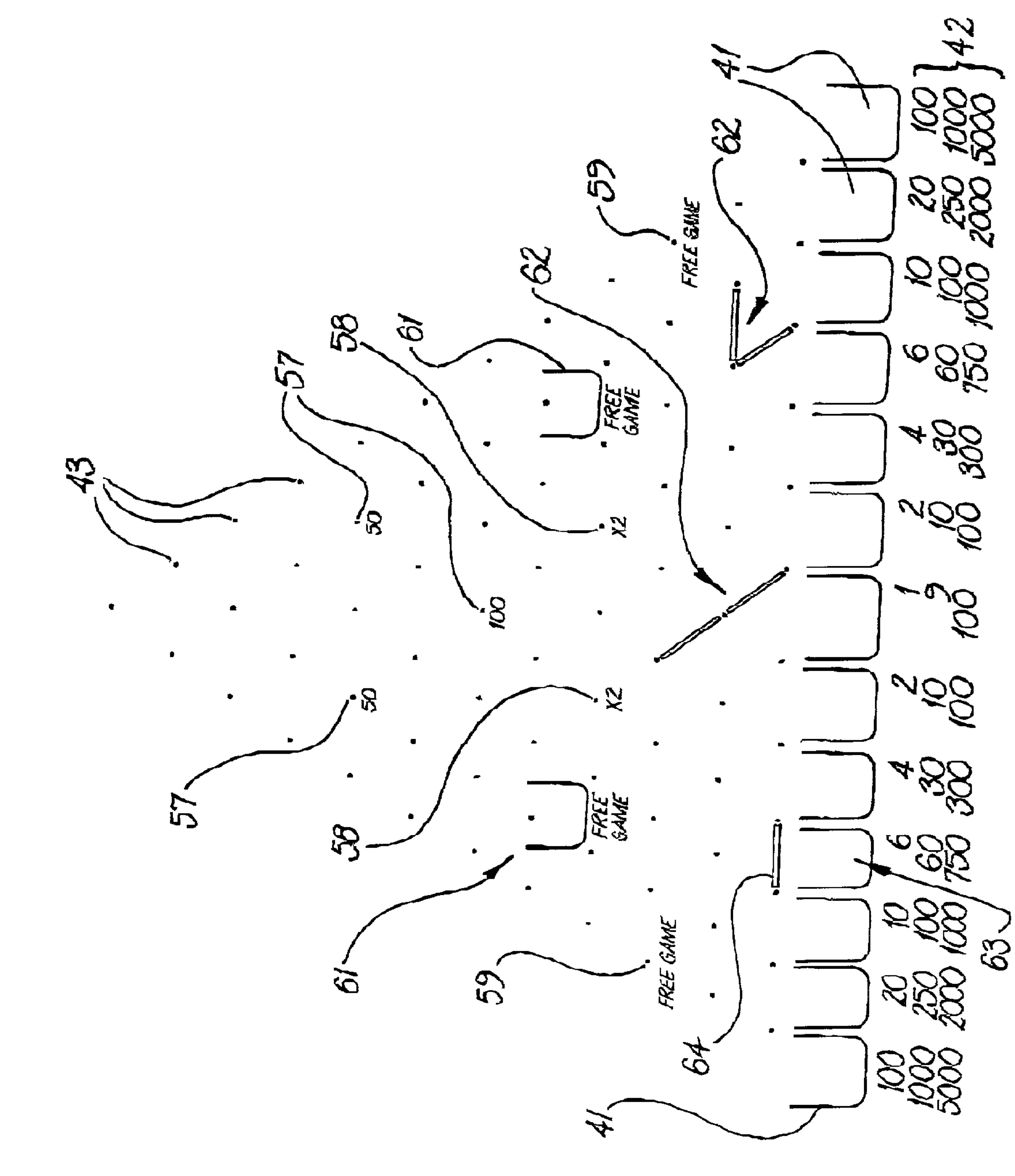
FIGS. 8-12 illustrate game screen layouts with further sets of preferred features.

FIG. 8 illustrates a game screen layout with a further set of preferred features. The features shown on this game layout are:

a) Fixed (or variable) prize awarded for any ball or a special ball (eg. colour, shape) or a pre-determined number of balls hitting a specific pin 57 (in the illustrated example, prizes are marked under the pins);
b) All wins from the game will be multiplied by a fixed (or variable) amount if any ball or a special ball (eg. colour, shape) or a pre-determined number of balls hit a specific pin 58;
c) One or more free games are awarded if any ball or a special ball (eg. colour, shape) or a pre-determined number of balls hit a specific pin 59;
d) Bonus or prize buckets 61 being placed in different positions;
e) Rods 62 joining pins to prevent balls from taking certain paths;
f) Buckets 63 may not always be open—a rod 64 may prevent the bucket 63 from being entered at certain times depending on triggers that occur in the game to open and close the bucket.

Figure 9:
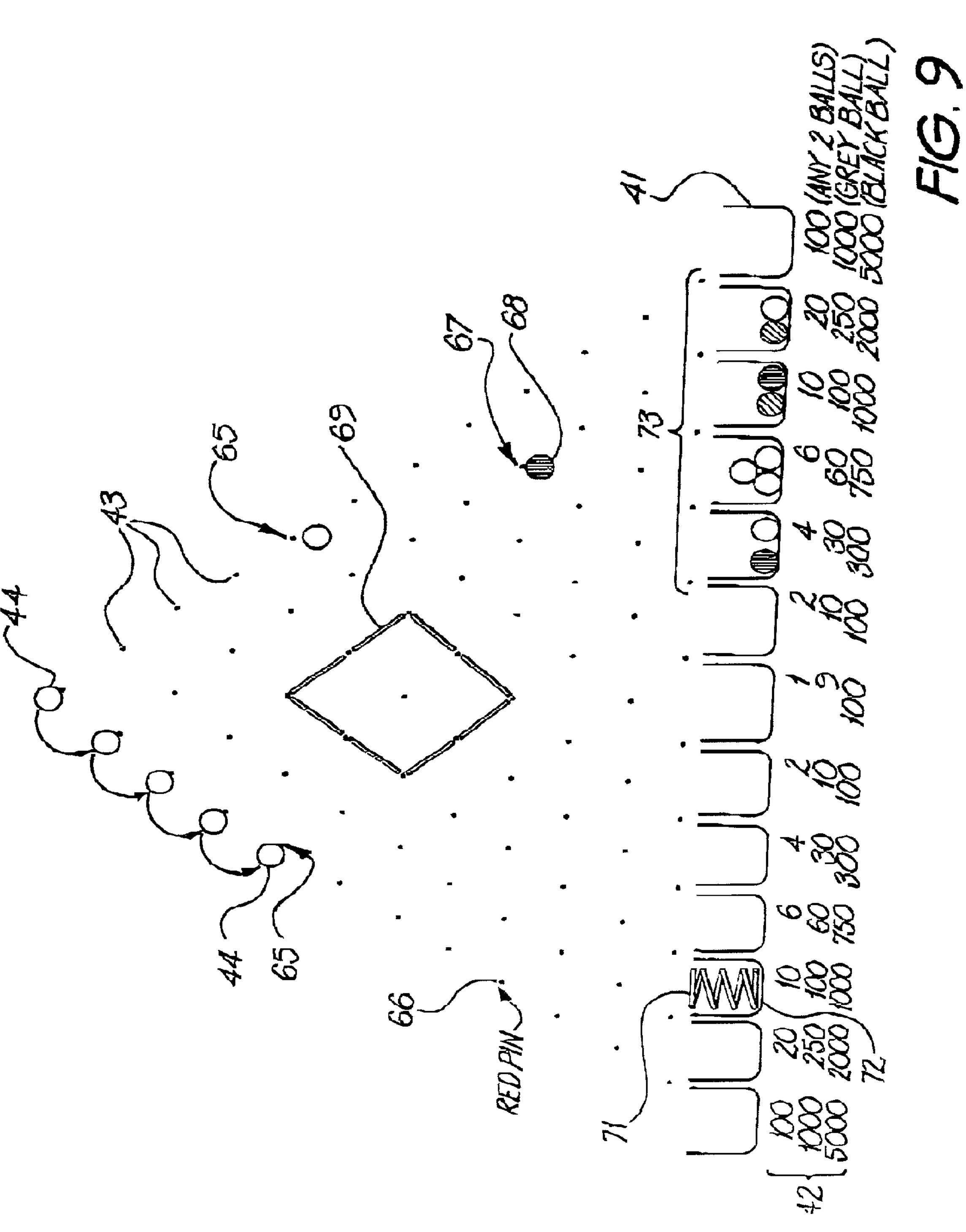
Figure 10:
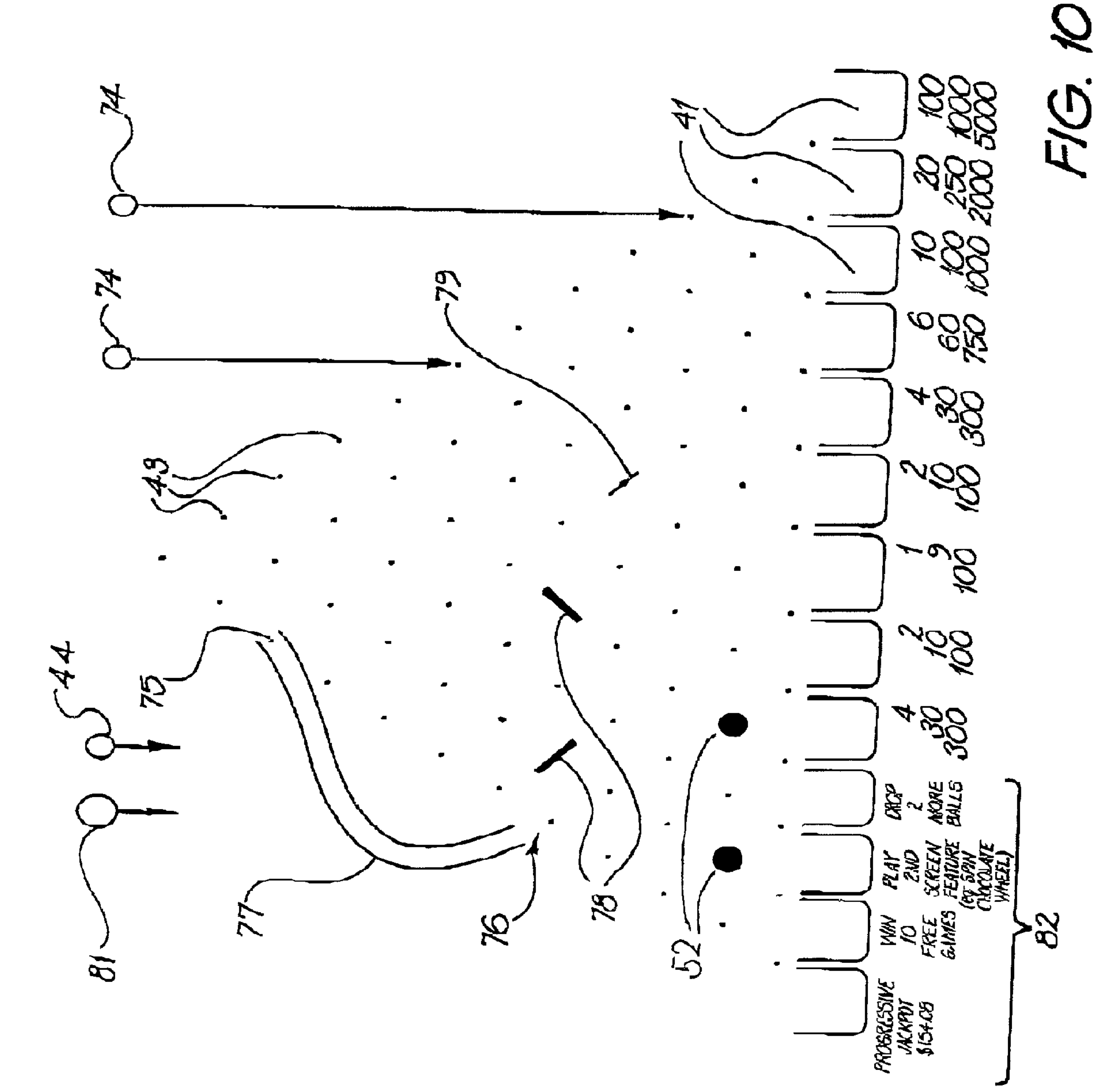

FIG. 9 illustrates a game screen layout with yet a further set of preferred features. The features shown on this game layout are:

a) Incrementing pins 65 where each time a ball or a specific type of ball hits the pin the indicator will increment. For example, a feature may be awarded when the incrementing pin reaches 5;
b) Different coloured pins 66 may give bonuses for being hit, or being hit by specific balls or a specified number of balls. The pins which are coloured may change from game to game;
c) Balls 68 may get stuck to certain pins 69 and/or when certain pins are hit a ball or balls may be released from the pin to drop in addition to the ball which hit the pin;
d) Certain features may involve complete sections 69 of the pin layout being blocked off giving an improved chance of balls landing in the outside buckets.
e) On certain occasions, a spring 71 may appear in a certain bucket(s) 72 such that if a ball lands in the bucket it will bounce back out again;
f) Different patterns of ball combinations 73 and colours in the buckets 41 may pay different amounts. In the diagram (assuming only the highest win will be paid), the first bucket will pay 300 for the black ball, the second will pay 6 for any 2 balls, the third will pay 1000 for the black ball and the fourth will pay 250 for the grey ball;

FIG. 10 illustrates a game screen layout with another set of preferred features. The features shown on this game layout are:

a) Dropping balls 74 from different positions will alter the chance of getting balls into the outside buckets. The drop position may be bought or random or a special feature;
b) A shortcut pin 75 may ensure that if it is hit the ball will be diverted to another position 76 on the screen via a path 77;
c) Flippers 78 may randomly or by way of player skill be used to flick balls in different directions when hit;
d) Diverter pins 79 can ensure that if they are hit the ball will fall in a fixed direction;
e) Different sized balls 81 could be used randomly or bought such that the bigger the ball the less likely it will fall into a hole;
f) A ball or a special ball (eg. colour, shape) or a pre-determined number of balls landing in certain buckets 82 may award special features instead of prizes.

Figure 11:
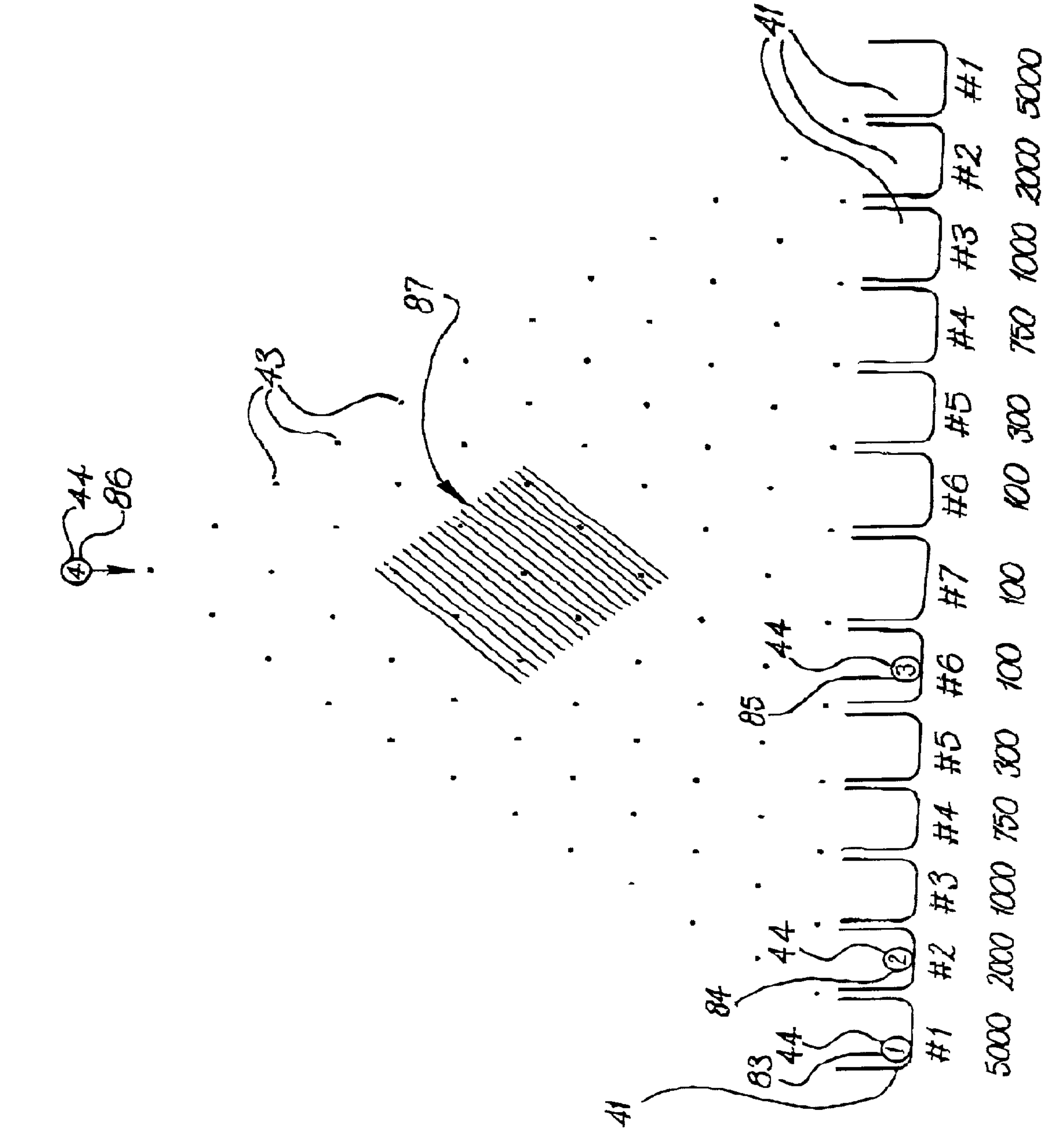

FIG. 11 illustrates a game screen layout with still another set of preferred features. The features shown on this game layout are:

a) Balls 83, 84, 85, 86 can be numbered for different features or win patterns. In this case, wins are paid if the correct numbered ball lands in the correct bucket.
b) Hence ball 83 (1) and fixed ball 84 (2) will pay 5000 and 2000 respectively, but 85 (3) will not pay a prize;
c) Prize zones 87 may be used. For example, a bonus may be given if all the pins within a fixed zone are hit (and hence become lit).

Figure 12:
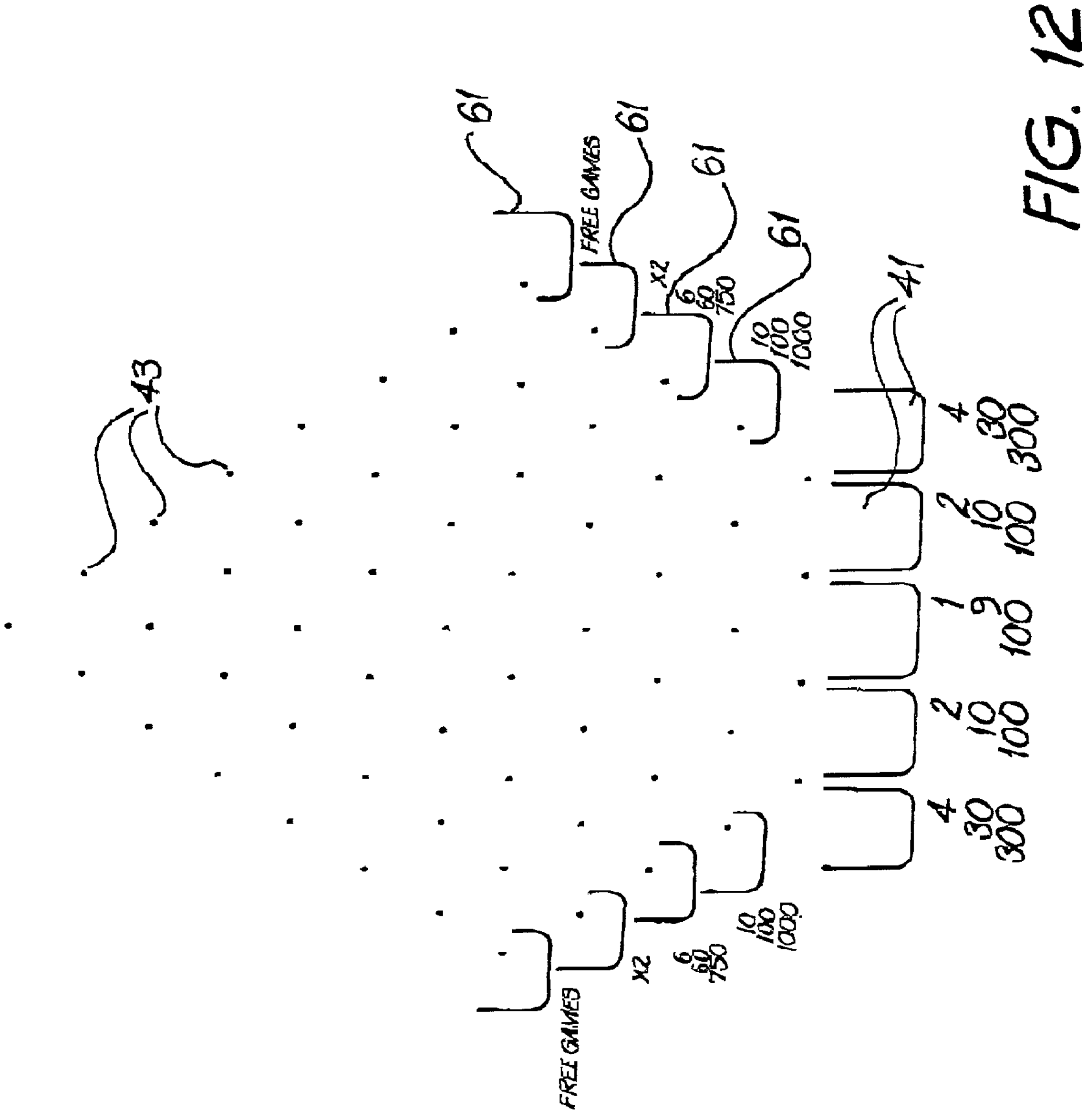

FIG. 12 illustrates a game screen layout with yet another set of preferred features. This diagram demonstrates how different shaped pin patterns can be used to vary the game.

Figure 13:
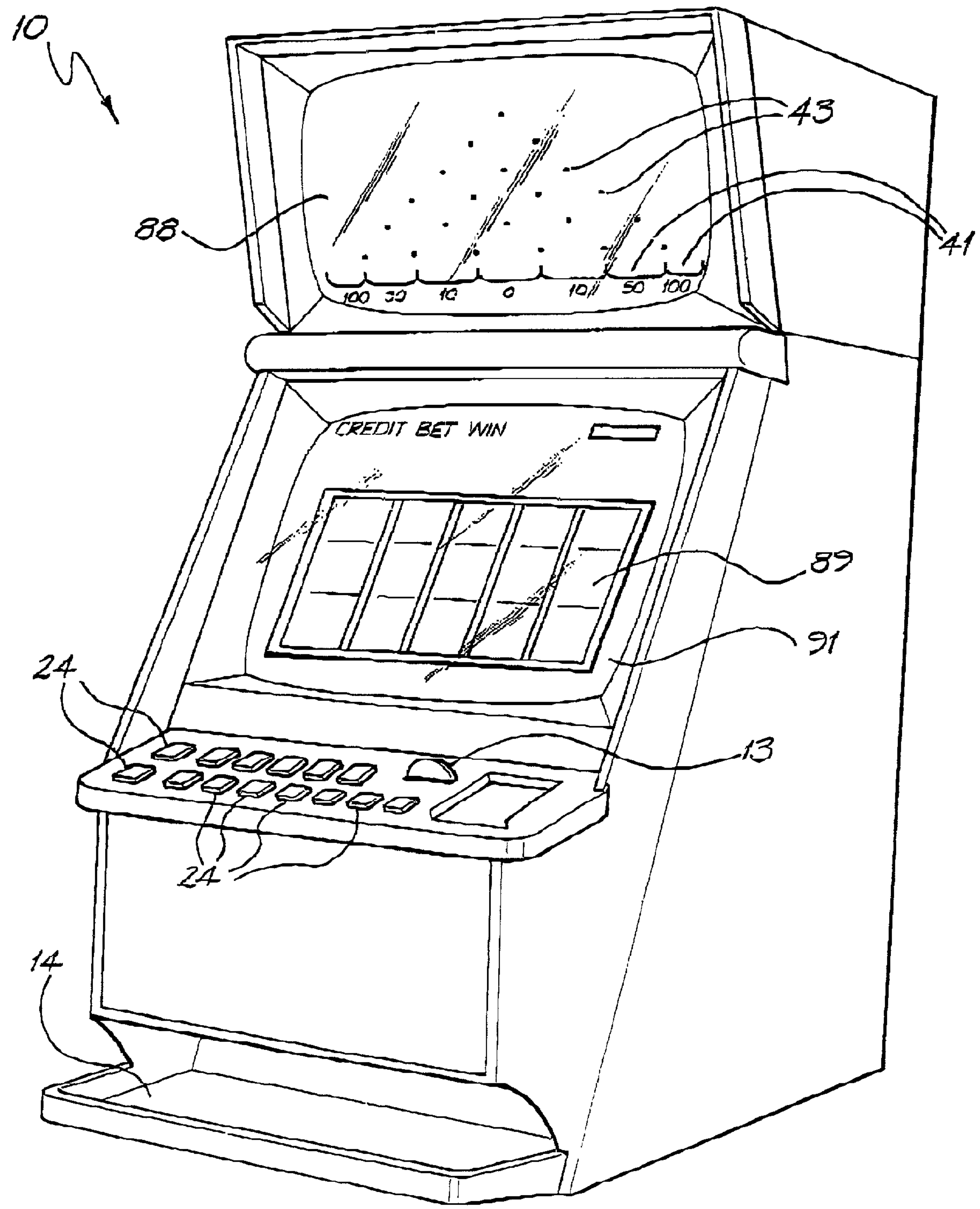
FIG. 13 illustrates a gaming console with button switch controls and two displays, incorporating a simple embodiment of the present invention in combination with another style of game (in this case a spinning reel game)

FIG. 13 illustrates a gaming console with button switch controls 24 and two displays, incorporating a simple embodiment of the present invention shown on a top screen 88 in combination with another style of game 89 (in this case a spinning reel game) shown on the lower screen 91.

Prizes are paid according to either the number of balls which are in each ball capturing location or container 41 at the end of the ball drop and/or the manner in which the pins are hit. Note that in the attached figures, the ball capturing locations are shown as cups, but may also be pairs of closely spaced pins (less than a ball diameter), or other suitable retaining device. Prizes may also be paid according to the type of balls dropped. For example, red balls may pay double the prize of the blue balls, or prizes may be paid according to indicia such as numbers on the balls which are in any container. When the indicia are numbers, the numbers may represent prize values or prize multipliers.

Figure 14:
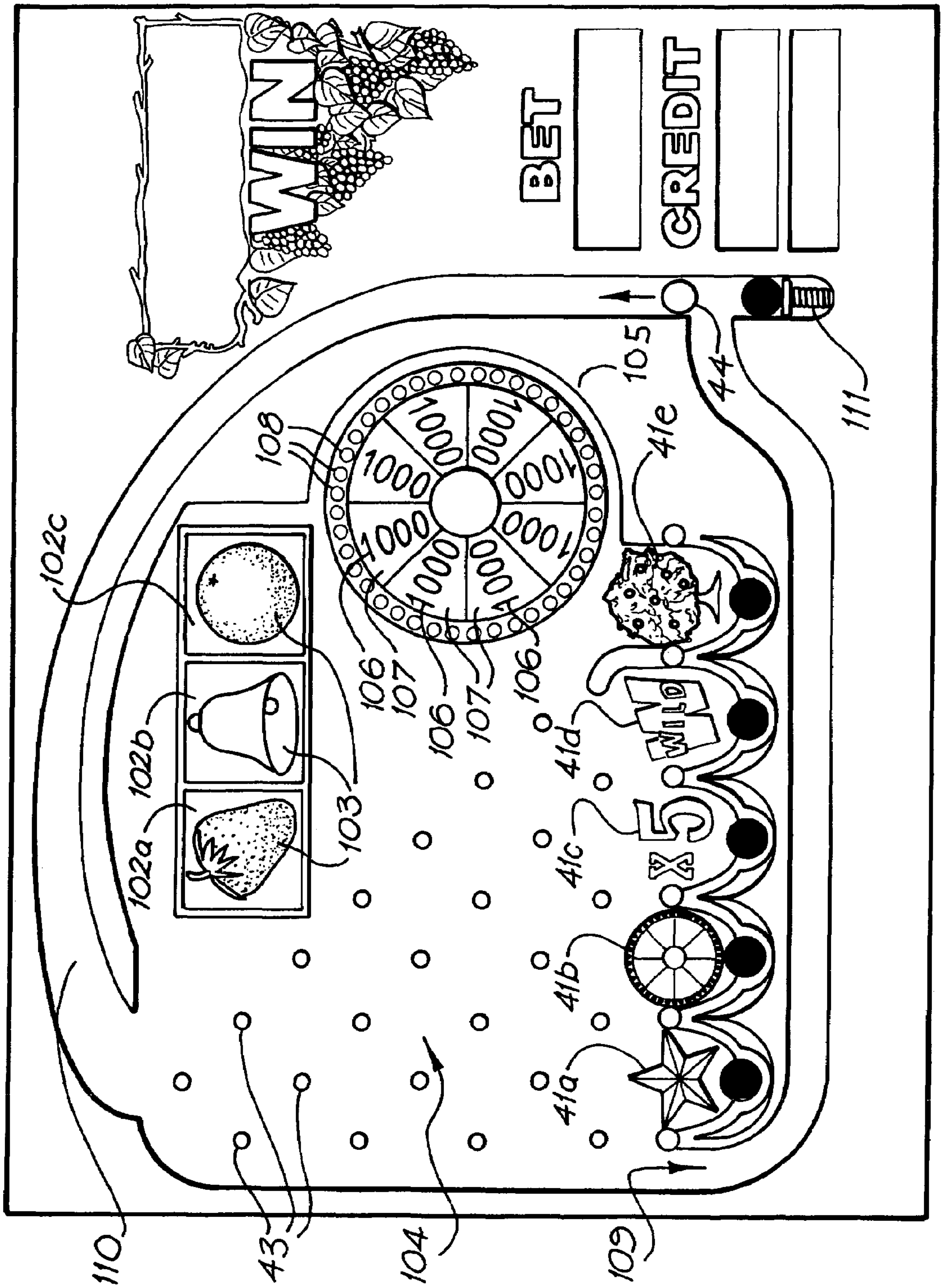
FIG. 14 illustrate game screen layout for a preferred base game according to the present invention.

The preferred embodiment of the present invention, as illustrated in FIG. 14, provides a spinning reel game 101, which operates in co-operation with a pin and ball game. In the illustrated embodiment, the spinning reel game 101 has three reels 102*a*, 102*b*, 102*c*, however it will be recognised that the game could employ a variety of formats with differing numbers of reels. The reel display shows no more than one full symbol 103 per reel 102*a*, 102*b*, 102*c* at any one time but it would also be possible to show one or more rows above and below the centre line if desired. Each reel has a pseudo reel strip, containing a plurality of different symbols 103, and various displayed combinations across the reels 102*a*, 102*b*, 1102*c* will result in prize winning conditions. In this context the word prize includes bonuses and feature games.

The game illustrated in FIG. 14 also includes a pin and ball game feature comprising, a labyrinth of pins 104, a ball firing mechanism 111, a firing channel 110, a no-win return channel 109, and a set of five containers, or buckets 41*a*, 41*b*, 41*c*, 41*d*, 41*e*, into which the ball 44 may fall. Each of the five buckets 41*a*, 41*b*, 41*c*, 41*d*, 41*e* provide a bonus condition which either provides a prize in addition to any prize awarded as a result of the outcome of the spinning reels 102*a*, 102*b*, 102*c*, modifies the outcome of the spinning reel game 101, or provides an additional bonus game. A chocolate wheel 105 is also provided on the display of the main game and is use in conjunction with one of the containers to provide a bonus feature.

The chocolate wheel 105 is divided into a plurality of wheel segments 107 with one symbol or prize indicia 106 indicated or displayed in each segment 107. The prize indicia or symbols 106 are changed at the commencement of each main game at the same time as the reels 102*a*, 102*b*, 102*c* are spun and the ball 44 is fired. Because the symbols or prize indicia 106 change from game to game it is desirable for the central portion of the chocolate wheel to not rotate, so that the symbols or prize indicia 106 can be viewed by the player. Therefore, the central portion of the wheel which carries the symbols or prize indicia 106 remains stationary, during the Chocolate Wheel Feature, and rotation is indicated by a series of virtual lights 108 around the periphery of the wheel 105, which simulate the circumferential pins of a physical chocolate wheel and act as rotation indicators. The virtual lights 108 indicate rotation by lighting in sequence in a so called "chasing pattern" such that the illuminated lights change in a rotating pattern. The rotation will slow to a stop with a single light or a small group of lights left illuminated adjacent to one of the wheel segments 107 to indicate the prize indicia or symbol 106 carried on that segment as the selected symbol or prize. The function of the containers will be described in greater detail below.

To play the game the player must first stake a wager and in this game the size of the wager determines which features of the game will be active. The player stakes credits to purchase the feature buckets 41*a*, 41*b*, 41*c*, 41*d*, 41*d*, 41*e*. The player must buy at least one bucket but may buy up to five. A stake of one credit buys the first bucket (left most) 41*a*, two credits buys the first bucket 41*a* and the second bucket 41*b*, and so on to a maximum of 5 credits which buys all of the buckets.

The player may also bet more than one credit per bucket in which case the prizes will be multiplied by the number of credits bet per bucket. For example if the player bets 3 credits on 2 buckets (ie a total of 6 credits) then all prizes will be tripled and only the features from buckets 1 and 2 will be available to be won in the game. In practice this bet is achieved by selecting the number of buckets and the amount to be bet per bucket. The reel strips on the rotatable reels 102*a*a, 102*b*, 102*c* (ie the sets of symbols 103 on the reels) may also differ from game to game depending upon the number of buckets bought.

When the player has made a bet and activates the game, one ball 44 only will be shot along the firing passage 110, through the pins 43 by the firing mechanism 1ll, and at the same time the reels 102*a*, 102*b*, 102*c* will be spun.

Certain combinations of symbols 103 on the three reels 102*a*, 102*b*, 102*c* will be wining combinations and will always award a prize when they spin up regardless of where the ball 44 lands. The ball may miss the buckets 41*a*, 41*b*, 41c, 41*d*, 41*e* altogether and travel down the no-win return path 109, or alternatively may land in one of the buckets 41*a*, 41*b*, 41*c*, 41*d*, 41*e*. If the ball 44 lands in an unpurchased bucket the feature will not apply, however if the ball lands in a bucket that was bought then the outcome will be modified as determined by the particular bucket.

The bucket features for the buckets from left to right are as follows:

1. The first bucket 41*a* increases the chance of getting a Free Game Feature trigger. A combination of 3 STAR symbols on the reels 102*a*, 102, 102*c* will trigger the Free Game Feature, or a ball 44 in the second bucket (the STAR bucket) 41*a* with two STAR symbols on the reels 102*a*, 102*b*, 102*c* will also trigger the Free Game Feature. The Free Game Feature consists of 10 free games during which all wins will be multiplied by three, and the games will be played at the same bet as the game that triggered them.

2. The second bucket 41*b* contains a chocolate wheel symbol and causes the chocolate wheel 105 on the right side of the screen to spin if the ball 44 lands in this bucket. An additional prize will be awarded that is dependent on the symbol 106 that the chocolate wheel lands on.

3. The third bucket 41*c* provides a prize multiplier. If the ball lands in the third bucket, any win on the reels will be multiplied by 5.

4. The forth bucket 41*d* also provides a substitute function similar to that of the second bucket, but in this case it provides a substitute symbol to make any three of a kind combination. That is, if two of the same symbol 103 appear on the reels 102*a*, 102*b*, 102*c* and the ball 44 lands in the S bucket 41*d*, then the prize for three of a kind for the symbol of the pair of symbols will be awarded. Note that this includes the Free Game Feature trigger symbol and hence is another way of triggering the Free Game Feature.

Figure 15:
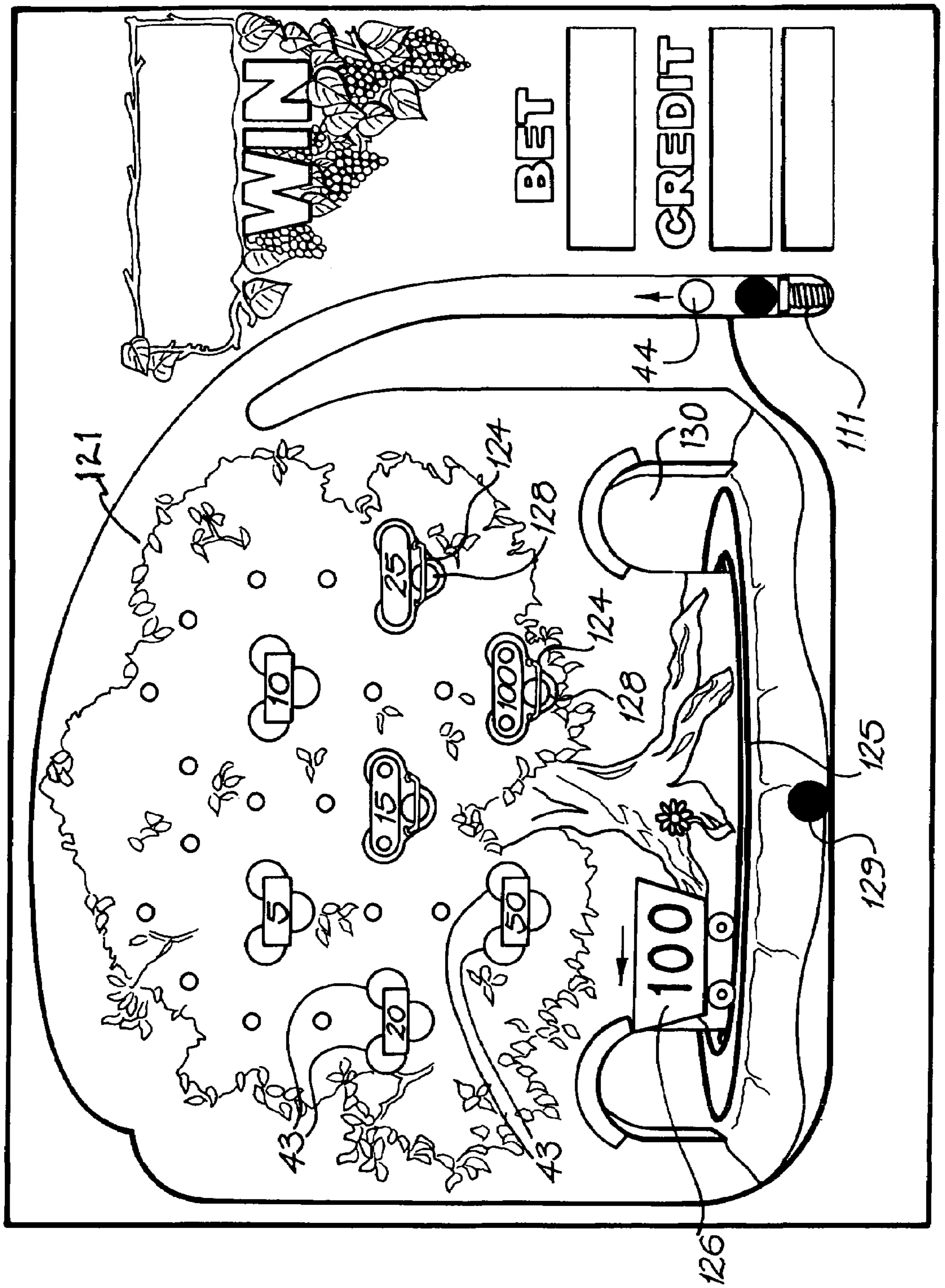
FIG. 15 illustrates a feature game associated with the base game of FIG. 14.

5. The fifth bucket 41*e* will trigger a second screen feature. If the ball lands in this bucket the game screen will be replaced temporarily by another screen which plays an animated bonus game. Typically such bonus games are guaranteed of awarding a prize although this is not always the case. The screen layout for one possible version of second screen bonus game is illustrated in FIG. 15. In this case the bonus game comprises an animation in which a number of balls 44 are fired one after another into the tree 121, where they fall through a plurality of targets comprising cups 124 extending between pairs of pins 43. The balls may fall into the cups 124 or bounce off the pins as with other pin and ball games. If a ball misses all of the cups 124 it may fall into a railway skip 126 moving around a track 125 at the base of the tree, or alternatively it may fall to the bottom of the display where it will disappear through hole 129.

Prize values are assigned to each cup at the beginning of the bonus game and are indicated on the cup for the player to see. The railway skip 126 also has a prize value associated with it which appears on its side and changes each time the skip emerges from the tunnel 130. The prize awarded to the player at the end of the feature game is the accumulation of all of the prize values for each ball that lands in a cup 124 or the railway skip 126 during the game.

Holes 128 are positioned behind each of the cups to allow a ball 44 to pass through the cup, such that the cup remains empty to receive further balls during the game, and such that the prize associated with each cup may be won multiple times in one game.

The player initiates the feature game buy pressing a button on the console, which causes a plurality of balls 44 to be fired in an arched path towards the tree.

The plurality of game features described with reference to FIGS. 3-15 and those described below, can be mixed in a variety of other combinations and each of the features may be offered for purchase by the player in a particular game (eg, an additional card 7, may buy less holes or more cups).

The basic structure of the game can be varied by:

(i) changing the type of balls to be dropped, such as balls of different sizes, balls of different colours and/or balls carrying different numbers which are equal to prizes,
(ii) changing the functions of balls to be dropped,
(iii) changing the number of balls to be dropped,
(iv) changing the position from where the balls are dropped,
(v) changing the number of rows of pins,
(vi) changing the pin pattern,
(vii) awarding prizes/bonuses/features depending on how the containers and/or pins are hit,
(viii) varying the number of balls such that the higher the bet, the more balls may be purchased,
(ix) changing the position of prize buckets,
(x) changing the number or position of holes amongst the pins
(xi) allowing access to different tools or controls which may affect the path of the balls, (xii) incorporating other types of games into the base game. For example, spinning reels (see below), keno, bingo, card games, second screen animations, chocolate wheels (see below) and so on. These could be bonus features awarded from the base game, base games that trigger a feature of the pin and ball game or may be played in conjunction with the base game (eg, reels spin and then balls drop for every game played).

Note that any of the types of game structures or features listed above, may change on a game by game basis or as a special feature when triggered by a particular event during the base game. In some cases, the player may even be able to select the structure that they want.

The betting strategy provided by the game can be any of the following:

(i) each credit buys one ball, therefore, a bet of 10 credits buys 10 balls,
(ii) varying the number of balls such that the higher the bet the more balls drop, for example: Bet 1, 3, 6, 12 and 20 credits give 5, 6, 7, 8, and 9 balls respectively,
(iii) varying the number of pins such that the higher the bet more or less rows of pins appear,
(iv) varying the number of pins such that the higher the bet more or less pins appear,
(v) varying the number of containers such that the higher the bet more containers become available. For example, a bet of 1 credit buys the first 4 containers from left to right; a bet of 2 credits buys all eight,
(vi) varying the number of pin features such that the higher the bet more pin features can be won,
(vii) varying the size of the prizes such that all prizes are multiplied (preferably linearly) by a factor which is a function of bet size,
(viii) varying the number of active balls dropped, with the same number of balls being be dropped from game to game, independent of the number of balls purchased, and with unpurchased balls being distinguished by appearance,
(ix) varying the size or shape of the balls to change the chance of specific effects occurring,
(x) varying the location from which the balls are dropped, such that the further out from the centre that the balls drop, the greater chance of the balls landing in the outside buckets which will have larger prizes,
(xi) varying the number of holes that appear for the balls to disappear into,
(xii) varying the function of the balls under certain circumstances,
(xiii) varying the number of tools available to re-direct the path of the balls,
(xiv) varying the number of prize zones that are available,
(xv) varying the number of balls required in a bucket to give a prize (ie. a higher bet requires fewer balls),
(xvi) varying the number of times a pin has to be hit or the number of pins that need to be hit in order to award a bonus feature (ie. a higher bet requires fewer hits or fewer pins).

For the betting strategy where higher bets buy additional balls, a low bet may result in the balls that have not been bought still being shown to drop. In this way, the player can see prizes that they have missed due to their low stake, and can possibly still use the balls that weren't bought towards feature triggers. The balls that have not been bought would need to be easily distinguished from the bought balls, for example, they could be smaller and/or transparent in appearance, or merely a different colour.

In general, prizes will be paid according to how many balls are in each container.

Containers may have the following features or characteristics:

(i) a free game, free balls or any other type of bonus can be won when certain containers are filled in a pre-determined way, for example: 10 free games are won when 2 or more balls end up in the last column,
(ii) containers may not always be open, they may have a top or cover which can prevent balls from entering the container under certain conditions,
(iii) some containers may have springs which will flick the balls to other containers,
(iv) some containers may become bonus baskets,
(v) a specified number of balls may need to drop into the same container in order to win a prize or jackpot, for example, 3 balls in container 1, pays 100 credits,
(vi) balls may remain in the containers across multiple games allowing them to accumulate as each game is played,
(vii) as a special feature, the prizes associated with particular containers may become much larger,
(viii) an animated object may sit above the container and catch balls before they drop into a container possibly moving them to other locations,
(ix) roaming containers could exist that move position from game to game or as the balls drop or as a special feature, the containers may also be moving while the balls drop.

Pins can also be provided with specific features or characteristics as follows:

(i) depending on either the number of times each pin is hit and/or whether or not certain patterns such as a row, diagonal or diamond shape made up of hit pins occurs, prizes or bonuses are paid such as:
 free games
 free balls
 second screen features
 wins multiplied by odds
 progressives,
(ii) the pins can occur in different patterns from game to game, for example: in one game they make up a triangular shape; in another, a diamond shape,
(iii) pins may swallow or capture balls when hit,
(iv) pins may release balls when hit,
(v) each time a pin is hit it may become lit, change colour and/or record the number of hits to award bonuses,
(vi) pins may have different colours so that when a certain combination of colours are all lit bonuses are paid,
(vii) pins may be tilted so that the ball bounce will be biased to one side,
(viii) pins may have holes in them for the ball to pass or may be able to be knocked over for the ball to continue on its path,
(ix) pins, in any pattern, may randomly flash during the ball drop sequence awarding bonuses,
(x) pins may be greyed out or move in and out to make it easier/harder for balls to roll,
(xi) pins may be joined by a rod to block balls from rolling down certain paths,
(xii) pins may have numbers on them which represent the amount of credits, free games, etc. won when they are either hit or lit,
(xiii) when all pins are hit/lit a bonus is paid,
(xiv) some pins may have the ability to flick the ball in any direction,
(xv) some pins may be sticky such that if a ball hits them, it will stick and stay on the pin, this could create a block where balls can no longer pass through that position or another ball could be required to hit the stuck ball in order to dislodge it, (xvi) for the duration of a free game feature, all holes that are normally present to swallow balls during the base game could be replaced by pins hence guaranteeing a prize for each ball dropped in a free game (or at least giving a higher probability of prizes), (xvii) there may be feature pins, for example, free game pins such that if a certain number of free game pins are hit a free game feature will be awarded, alternatively, "shortcut" pins such that when a ball hits the shortcut pin it will skip straight to another position on the screen, (xviii) pins may have deflectors such that when hit, the will always deflect a ball in one specified direction, (xix) as a special feature, the centre pin or pins may become larger, blocking off access through the centre and hence increasing the chance of balls falling towards the outer containers, (xx) all pins may become the same colour as a special feature, (xxi) "elastic bands" may be placed around 2 or more pins such that if a ball drops against the band, it will be bounced off rather than merely deflected.

Balls can also have different features and characteristics as follows:

(i) the balls may be the same colour, different colours during the same game or change colours from game to game, they may also have numbers on them, both the colouring and numbers can be utilised to award prizes, (ii) special balls when hitting pins may split up into a number of balls, (iii) special balls may have the ability to jump from column to column and award prizes, (iv) special balls will enable bonuses to be found, (v) there may be a larger ball which can knock pins over or split into smaller balls, (vi) balls may fall down the pin holes, (vii) a slot reel, chocolate wheel or other mechanism may be activated by a ball or other means to provide a multiplier, bonus or trigger, (viii) different sized balls could be provided such that bigger balls are less likely to fall down holes, (ix) different shaped balls could be provided such that spherical balls can only fall down round holes, cubic "balls" will only fall down square holes, elliptical "balls" can only fall down oval holes etc, (x) large balls or "superballs" may block holes or knock out pins, (xi) the speed of the ball drop may differ depending upon the size of the ball, (xii) as balls drop, the path that they follow may be plotted, for example, the pins that they hit may change colour, if another ball follows that same path or a lit path a bonus (prize or feature) may be given, alternatively, if all pins become lit, a bonus (prize or feature) may be give, the lit pins may even be carried across from one game to the next, (xiii) as balls drop, blockages formed as a blocking element such as a pin or other object may be placed along the path that they follow such that no other ball may drop through the blockages, (xiv) the balls could be in the shape of coins or other objects, (xv) certain balls may alter the paths for other balls, for example, if a certain ball drops in one direction when it hits a particular pin, then all balls to hit the same pin from then on will also drop in that same direction, (xvi) when balls drop into holes something may happen to them, for example, they may be channelled into containers or come out other holes or re-appear in other sections of the screen, (xvii) balls may change colour as they drop, or may change the colour of pins that they hit to their own colour, similarly, certain balls that drop into a container may change the colour of all other balls in that same container, (xviii) some wins could be paid in balls rather than credits, that is, certain events may cause extra balls to be dropped as part of the same game, these may or may not be at extra cost to the player, (xix) some balls may "defy gravity" by 'dropping' across the screen horizontally or upwards or similar, hence, prize containers may appear on all sides of the pin layout rather than just at the bottom, (xx) "Fireballs" may exist that burn the pins as they hit them, (xxi) balls may be numbered or have letters on them, if they land in a certain order or spelling a specific word, a bonus (prize or feature) may be awarded, (xxii) holes may disappear or close up as soon as a ball drops into them.

Skill elements can also be provided in a game, for example:

(i) games may include an element of skill provided by including player controls which enable the player to drop or project the balls at different angles, (ii) the game may have a flipper to flick the balls.

Tools or Controls can also be provided in some games such as:

(i) flippers could be provided at certain locations such that if a ball hits the flipper it will (automatically or by control of the player) be flicked back to drop through some or all of the pins again, hence providing a second chance at prizes or feature triggers, (ii) ladders, magnets or some other objects could cause the balls to move upwards or in other directions instead of just dropping downwards.

In certain games, a game feature of a chocolate wheel can be provided which could have features such as:

(i) a chocolate wheel could replace a prize container where as the ball drops through the chocolate wheel, it will spin and pay the prize that is spun up, (ii) an independent chocolate wheel could be displayed where certain triggers or prizes can cause the chocolate wheel to spin to reveal a bonus by way of a prize, win multiplier, number of free games, extra balls to drop, change in the game structure or similar, (iii) an independent chocolate wheel could be displayed so that whenever balls fall into certain containers or similar, the chocolate wheel will spin to reveal the prize that will be awarded.

Games can also include a game feature of spinning reels which may have features such as:

(i) a spinning reel game could be played above the pins such that when a winning combination occurs on the reels, coins could come out from below the reels and drop into the pins so that the base game determines the prize, (ii) a spinning reel game element could be used to determine the base game structure, for example, the prize values, position of holes, number of pins, pin layout or similar, (iii) containers could have multipliers on them, then, when a win on a spinning reel game occurs, a ball could be dropped through the pins to determine how much the win will be multiplied by.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. An electronic gaming console having credit means, reward means, game control means, display means, and player input controls, the game control means being responsive to the credit means and the player input controls to play a game which is displayed on the display means and if a winning event occurs, a player reward is awarded by the reward means, the gaming console being characterised in that the game provides a video display, for displaying a game image of a hybrid game comprising two different subgames played simultaneously wherein;

a first of the sub-games provides a game image displayed on the video display, the game image comprising images of one or more rotatable reels of a spinning reel game; and the second of the sub-games provides a game image displayed on the video display, the game image comprising a labyrinth of pins or pins and holes of a pin and ball game, wherein, the player input controls allow the player to initiate the motion of the one or more rotatable reels of the first sub-game and one or more ball images of the second subgame on the display, player rewards being awarded on the occurrence of an event where one or more of the reel and one or more of the ball images come to rest in predetermined prize winning locations, the spinning reel and pin and ball sub-games each potentially contributing to a single hybrid game outcome which depends on outcomes of each of the subgames and player rewards awarded to the player as a result of the combined game outcome are awarded as a result of events of the first and second subgames and/or combinations of these events, and at least one of the game outcomes results in a preselected player reward being awarded when the reel game outcome and the pin and ball game outcome combine to define a preselected winning event, at least one of the game outcomes being the award of a feature outcome, the feature outcome being the awarding of either a feature event or feature game or the awarding of a jackpot prize, the feature outcome being awarded when the reel game outcome and the pin and ball game outcome, when combined, together define a winning combination, wherein the pin and ball game has a number of prize zones each offering at least one bonus feature or prize, wherein the number and position of the prize zones is variable from game to game, wherein the number and position of the prize zones are selectable by a player, and wherein the number and position of the prize zones are selected as a result of the size of a bet wagered by the player on the particular game, wherein the prize zones comprise targets, and wherein targets move during the game.

2. The gaming console as claimed in claim 1, wherein the target is a railway skip car running around a track and periodically appearing out of a tunnel.

3. The gaming console as claimed in claim 2, wherein prize values associated with targets change during a game.

* * * * *